United States Patent [19]

Veser et al.

[11] Patent Number: 5,145,652
[45] Date of Patent: Sep. 8, 1992

[54] APPARATUS FOR THE REMOVAL OF NITROGEN BURNER EXHAUST

[75] Inventors: Kurt Veser, Heidelberg; Hermann-Eugen Müller-Odenwald, Mannheim, both of Fed. Rep. of Germany

[73] Assignee: Kraftanlagen Aktiengesellschaft, Heidelberg, Fed. Rep. of Germany

[21] Appl. No.: 725,385

[22] Filed: Jun. 28, 1991

Related U.S. Application Data

[63] Continuation of Ser. No. 399,499, filed as PCT/EP89/00043, Jan. 18, 1989, abandoned.

[30] Foreign Application Priority Data

Feb. 24, 1988 [DE] Fed. Rep. of Germany ....... 3805791

[51] Int. Cl.$^5$ .............................................. B01D 50/00
[52] U.S. Cl. ........................................ 422/171; 55/78; 55/79; 55/84; 55/99; 165/8; 422/170; 422/172; 422/173; 422/175; 423/237; 423/239; 423/242; 423/243
[58] Field of Search ................... 422/170–173, 422/175; 165/8; 48/203, 76; 423/237, 239, 242, 243; 55/77–80, 99, 84

[56] References Cited

U.S. PATENT DOCUMENTS

| | | | |
|---|---|---|---|
| 3,126,945 | 3/1964 | Kuhner | 55/6 |
| 4,003,711 | 1/1977 | Hishinuma et al. | 423/239 X |
| 4,118,199 | 10/1978 | Völker et al. | 422/171 |
| 4,196,170 | 4/1980 | Cemenska | 422/172 X |
| 4,678,643 | 7/1987 | Fetzer | 422/175 |

*Primary Examiner*—Robert J. Warden
*Assistant Examiner*—Amalia Santiago

[57] ABSTRACT

Method for the removal of nitrogen from the exhausts of burners after they are cleaned of dust or sulfur, in which the nitrogen-bearing exhaust gases are reheated by the transfer of heat from the denitrogenated exhaust gases in a regenerative heat exchanger.

Before they are finally heated to the temperature level of the reduction reaction, the nitrogen-bearing exhaust gases, and, after their reduction, the denitrogenated exhaust gases, are passed countercurrently to one another in a cyclical alternation, through heat exchanging storage masses in an additional catalytic converter serving as the main converter, whose surfaces are provided with catalytically active compounds.

2 Claims, 1 Drawing Sheet

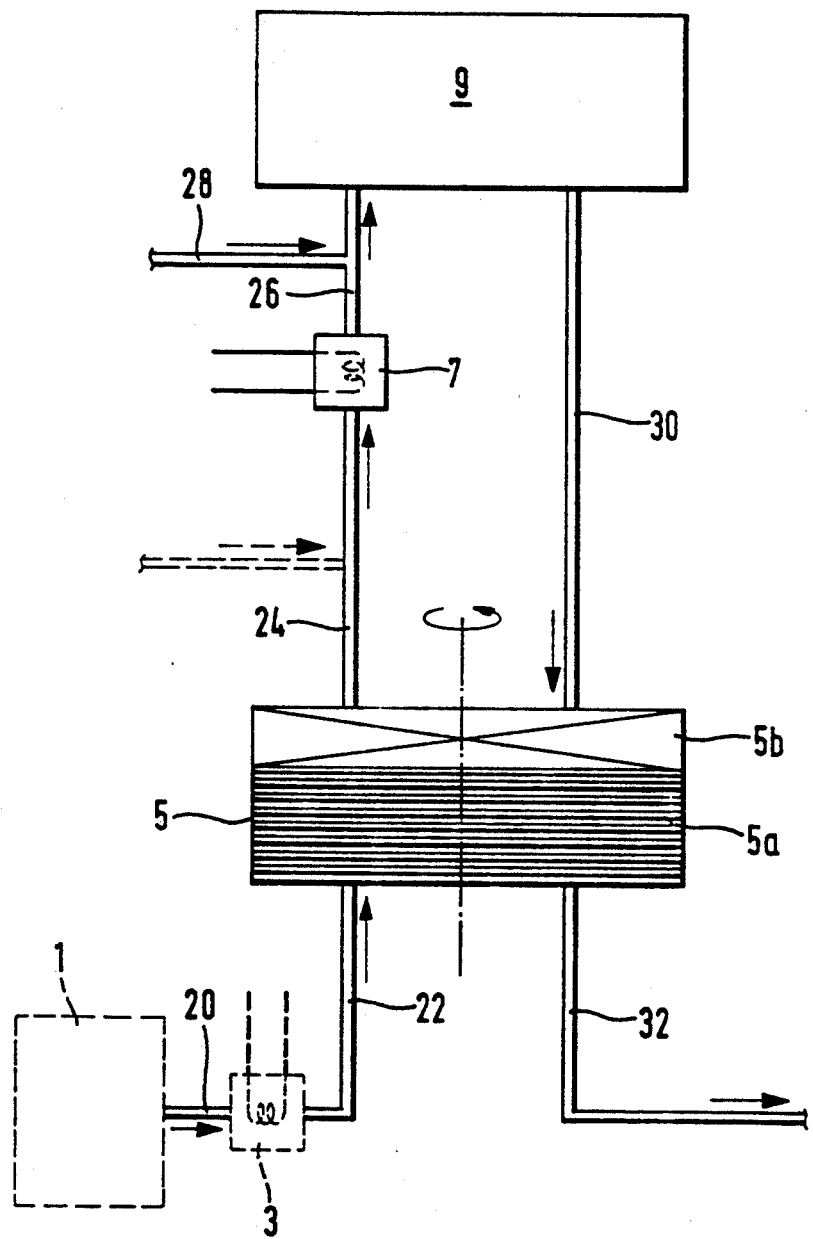

APPARATUS FOR THE REMOVAL OF NITROGEN BURNER EXHAUST

This application is a continuation of application Ser. No. 07/399,499, filed as PCT/EP89/00048, Jan. 18, 1989 now abandoned.

The invention is based on a method for removing nitrogen from burner exhausts from which the dusts or sulfur have been removed, and reheating them, and it relates to the apparatus intended for the practice of the method.

Methods are known for removing nitrogen from burner exhausts after the dusts or sulfur have been removed, and reheating them by transferring heat from the denitrogenated exhausts in a circulating regenerative heat exchanger—a so-called gas heat exchanger—in which, after reheating to the temperature level of the reduction reaction has been completed, a reducing agent is introduced into the nitrogen-bearing gas stream, and then the latter is carried over catalytically active surfaces of a catalyst.

In these methods the exhaust gases are first preheated and then heated with external heat to the optimum temperature level for the reduction before they are fed to a catalyst. Statically disposed carriers bearing catalytically active surfaces, and moving relative to the gas connections, especially those of the exhaust from the combustion air, have likewise become known. High-dust catalytic converters preceding the cooling of the flue gases in the combustion air preheater, as well as those preceding the removal of dust and sulfur, make use of the high temperature level for performing the reduction reaction, so they have no need for reheating. On the other hand, in the case of catalytic converters connected to the output from the dust remover, and especially from the desulfuration—the so-called cold-end converters—flue gas components that lead to deactivation, such as arsenic in the case of melting burners, are removed simultaneously with the removal of dust or sulfur, so that they will no longer interfere with and poison the catalysts. The gases from which the dust or sulfur has been removed are then passed through a gas heat exchanger—with an intervening heating to dry them, if desired—for the purpose of recovering heat from the denitrogenated gases before they enter the exhaust stack, and transferring it back to the gases entering the denitrogenating process, before the latter are introduced into a steam heater or into a combustion chamber for overcoming heat exchanger concentration, in order to heat them to the optimum reaction temperature for the denitrogenation before the gases enter the catalyst.

Common to all these apparatus is the problem that the input of the reducing agent must be very carefully distributed in accordance with the locally varying flow velocities and the likewise locally varying nitrogen oxide content in the flue gas stream. For this purpose, very complex flow smootheners as well as a great amount of measuring instruments and controls are needed. The requirements for a precisely metered input of the reducing agent become more stringent as the required reduction rates increase, since as the rate of reduction increases so does the danger that unconsumed reducing agent may be carried over into parts of the apparatus that follow, also increasing the possibility of undesirable reactions with other flue gas components. After a long period of exposure to catalyst poisons catalysts become deactivated and have to be replaced after, for example, 5 years. The life of the catalyst is thus limited by the reducing agent carryover, which puts stress on downstream parts of the apparatus and causes emissions to increase.

The invention is based on the problem of performing the reduction of nitrogen oxides in flue gases with a high degree of efficiency and without bulky equipment, with simple methods for the measurement and control of the addition and distribution of reducing agent in accordance with the localized and changing concentration and distribution of the flow of the nitrogen oxides upstream and downstream from the main catalytic converter.

For the removal of nitrogen from burner exhausts following the removal of dust or sulphur, with reheating of the nitrogen-bearing exhaust gases by thermal transfer from the denitrogenated gases in a regenerative heat exchanger is characterized by the fact that, in a cyclical alternation, the denitrogenated exhaust gases after the reduction of the nitrogen oxides they contain, and the nitrogen-bearing exhaust gases before their final heating to the temperature level of the reduction reaction, are carried countercurrently to one another, in an additional catalytic converter serving as the main converter, over heat exchanging storage masses whose surfaces are provided with catalytically active compounds.

By this contact between heat-exchanging storage masses whose surfaces are provided with catalytically active compounds and the nitrogen bearing and denitrogenated gases flowing countercurrently to one another, any amounts of reducing agent still contained in the denitrogenated gases are bound chiefly at the entrance end to the heat exchanging storage masses whose surfaces are provided with catalytically active compounds and at the same time they react with residual amounts of nitrogen oxides in the exhaust gas stream. Reducing agents bound to the heat-exchanging storage masses whose surfaces are provided with catalytically active compounds are fed to the nitrogen-bearing gas side. There these small amounts of reducing agent are in contact with the full amount of nitrogen oxides, so that this portion of the reducing agent becomes completely reacted.

Fundamentally, the method of the invention must be practiced with an apparatus constructed in the manner of a switching heat exchanger which includes heat-exchanging storage masses whose surfaces are provided with catalytically active compounds. More advantageous, however, is the use of a rotating regenerative heat exchanger, whether it has a rotating storage mass carrier and stationary gas connections, or whether it has a stationary storage mass carrier and rotating gas connections. In this case, residual reduction takes place in the largely denitrogenated gases in their direction of flow, and adsorption of any remainder of unconsumed reducing agents takes place on the heat-exchanging storage masses whose surfaces are provided with catalytically active compounds, while the temperature of these surfaces diminishes, and on the nitrogen-bearing gas side and in their direction of flow amounts of reducing agents adsorbed on these heat exchanging storage masses whose surfaces are provided with catalytically active compounds enter into reaction with the high nitrogen oxide concentration of the nitrogen-bearing gases as the temperature of these surfaces increases. In this connection it is advantageous if the nitrogen-bearing gases are heated prior to their passage through the storage masses whose surfaces are provided with catalytically active compounds and the denitrogenated gases are cooled after their passage through the said storage masses.

As an additional advantage towards a very uniformly distributed concentration of reducing agents in the nitrogen-bearing gas stream, the reducing agent alone or in mixture with a carrier gas is introduced into the nitrogen-bearing gas stream upstream or downstream from the final heating. Placing the introduction of the reducing agent upstream is involved especially in connection with the final heating in a steam heater, whereas in the case of final heating in a combustion chamber the introduction of the reducing agent will be performed downstream.

The adsorption of the reducing agent residues onto the surfaces of heat-exchanging storage masses provided with catalytically active compounds allows the denitrogenated exhaust gases emerging from the main catalytic converter to contain unreacted reducing agent. Furthermore, a precise setting of the necessary amount of reducing agent can be performed advantageously through the introduction of an additional portion of it downstream from the main catalyst, since subsequently, in addition to the simultaneously occurring post-reaction, any unconsumed reducing agent will be bound by adsorption onto the heat-exchanging storage masses whose surfaces are provided with catalytically active compounds and is transferred to the nitrogen-bearing gas side. This addition of reducing agent is performed only to the extent that, at the end of the heat-exchanging storage masses whose surfaces are provided with catalytically active compounds, the introduced reducing agent is fully reacted or adsorbed onto these surfaces.

The process can be performed to special advantage by a gas heat exchanger configured as a rotating regenerative heat exchanger with a layer of heat-exchanging storage masses whose surfaces are provided with catalytically active compounds disposed at the hot gas end, followed at the nitrogen-bearing gas end by a heater and main catalyst in tandem, and whose hot-gas end is connected to the main catalyst at the denitrogenated gas end. The main catalytic converter can in this case be constructed as a static converter or in the manner of a Ljungström preheater with a carrier moving relative to the gas connections and carrying catalytically active compounds.

By the method of the invention, wisps of reducing agent emerging from the main catalytic converter are homogenized and then deposited by adsorption uniformly onto the heat-exchanging storage masses whose surfaces are provided with catalytically active compounds, and are available in this form of deposit at the nitrogen-bearing gas end. The deactivation of the main catalyst, which ultimately leads to an increasing leak-through of reducing agent, can be retarded by this adsorption of the residual reducing agent and the cyclical alternation of exposure to the denitrogenated and the nitrogen-bearing gases and their countercurrent flow, since the heat-exchanging storage masses whose surfaces are provided with catalytically active compounds in this case need to satisfy only low reduction rates. The method permits the main catalyst to be designed with a reduced catalytically active area, i.e., in a smaller size, and to further reduce emissions. At the same time, complex measures, especially as regards flow smoothing and the measurement and control methods for precise control of the input of the reducing agent through continual measurement, can be avoided.

By the method of the invention the denitrogenation of exhausts is to be performed while making use of residual amounts of unused reducing agents carried in the exhaust gases issuing from the main catalyst such that the downstream parts of the apparatus will not be impaired by byproducts of the selective, catalytic reduction, and even at the end of a long run of the main catalytic converter, no intolerably great leak-through of reducing agents will escape the apparatus. Adsorptive coatings on the heat-exchanging storage mass of the gas heat exchanger can enhance this effect of capturing the leak-through of reducing agent and/or nitrogen oxides as a result of the cyclical alternation of adsorption and desorption between the denitrogenated and the nitrogen-bearing gas streams.

An apparatus for the practice of the method of the invention is represented diagrammatically to explain the idea of the invention.

According to the diagram, the exhaust gases to be cleaned of nitrogen are carried from a desulfurizer 1 first through an exhaust duct 20 for preliminary drying by a dryer 3. From the dryer 3 the exhaust gases are then introduced through a duct 22 into a gas heat exchanger 5. The revolving support in this gas heat exchanger has heat-exchanging storage masses 5a on the so-called cold side, in the form, for example, of common stacks of heating plates. On the hot side situated opposite the entrance of the gases to be cleaned of nitrogen there is disposed in this support a layer of heat-exchanging storage masses whose surfaces are provided with catalyzing compounds at 5b. After leaving this layer at the hot end of the gas heat exchanger the gases are fed through a duct 24 to a heater 7 in order to raise the temperature of the gases to an optimum level for the reduction reaction. The heater is warmed by external heat.

Downstream from the heater, reducing agent is fed through a line 28 to the gases moving through the duct 26 before the nitrogen oxides contained in the gases are largely removed in the catalyst as the gases pass through its catalytically acting fill. The denitrogenated gases then return through duct 30 into the hot side of the layer of heat exchanging storage masses whose surfaces are provided with catalytically active compounds, and on through this layer. After being carried through the heat exchanging storage mass 5a at the cold end, the exhaust gases have been cooled, by the transfer of heat to the gas stream being carried into the denitrogenation, to the temperature at which they are to enter the exhaust chimney, and they are carried through the flue 32 to the exhaust chimney, which is not shown.

EXAMPLE:

Gases from which nitrogen is to be removed issue at about 45°–50° C. from a wet desulfuration apparatus 1. In the next heat exchanger 3, the gases moist from the wet desulfuration are heated to about 70–90° C. and fed through the connecting duct 22 to the gas/gas heat exchanger 5 with a nitrogen oxide content of 1000 vpm. After they are preheated in the heat storage mass 5a, when they strike the heat exchanging storage mass 5b that is integrated with the hot side of the gas/gas heat exchanger, and whose surfaces are provided with catalytically active compounds, a first catalytic reduction of about 1% takes place. In this reduction the reducing agent, preferably ammonia, that has been absorbed from the largely denitrogenated gases by the side that is to be cooled, is consumed. The gases enter the duct 24 connecting to the heater 7, with a temperature of about 300°-320° C. and with a nitrogen oxide content of approximately 990 vpm. The gases are then heated to 330° to 35° C. in the heater 7, by steam for example. Approximately 950 vpm of ammonia is delivered through line 28 to the exhaust gas ahead of the static catalyst 9, depending on the required nitrogen oxide reduction. The exhaust gases leave the catalyst at 330° to 350° C. and about 60 vpm of nitrogen oxide, corresponding to a reduction of about 94%, and still contain about 20 vpm of unreacted reducing agent which is returned together with the gases through duct 30 to the regenerative heat exchanger 5. The residual ammonia is converted right at the entrance side by the heat-exchanging storage masses 5b whose surfaces are provided with catalytically active compounds, so that ammonia is absorbed and the nitrogen oxides are further reduced to about 50 vpm, and transferred to the side corresponding to the gases from which nitrogen is to be removed. After additional cooling within the heat storage mass 5a on the cold side of the regenerative heat exchanger, the denitrogenated exhaust gases pass free of reducing agents into duct 32 at about 100°-120° C. and are carried into the chimney.

We claim:

1. An apparatus for removing nitrogen from exhaust gases of a furnace installation comprising: means for removing particles selected from the group consisting of dust and sulfur from exhaust gases generated by a furnace installation; a gas heat exchanger connected to said removing means downstream thereof, said heat exchanger being a rotating regenerative heat exchanger having first heat exchange storage masses on a relatively cold side adjacent said removing means and having second heat exchanging storage masses with catalytically active compounds which are capable of removing nitrogen oxides and adsorbing reducing agent on a relatively hot side following the first storage masses, a second heater downstream and in fluid communication with of said second storage masses, means for introducing reducing agent downstream of said heater, a second catalytic converter downstream of said reducing agent introducing means and provided with denitration static catalytically active surfaces, conduit means upstream of said static catalytic converter for providing fluid communication between the static catalytic converter and said second heater, said conduit means being in fluid communication with said means for introducing reducing agent, means downstream of said second catalytic converter for connecting said second catalytic converter with said second storage masses for removing residual nitrogen oxides and adsorbing residual reducing agent in said exhaust gases, and means for removing cleaned gas from said first storage masses.

2. An apparatus for removing nitrogen from exhaust gases of a furnace installation comprising: means for removing particles selected from the group consisting of dust and sulfur from exhaust gases generated by a furnace installation; a gas heat exchanger connected to said removing means downstream thereof, said heat exchanger being a rotating regenerative heat exchanger having first heat exchange storage masses on a relatively cold side adjacent said removing means and having second heat exchanging storage masses with catalytically active compounds which are capable of removing nitrogen oxides and adsorbing reducing agent on a relatively hot side following the first storage masses, a second heater downstream of said second storage masses, means for introducing reducing agent downstream of said second heater, a second catalytic converter downstream of said reducing agent introducing means and provided with denitration, moving catalytically active surfaces, conduit means upstream of said second catalytic converter for providing fluid communication between the second catalytic converter and said second heater, said conduit means being in fluid communication with said means for introducing reducing agent, means downstream of said second catalytic converter for connecting said second catalytic converter with said second storage masses for removing residual nitrogen oxides and adsorbing residual reducing agent in said exhaust gases, and means for removing cleaned gas from said first storage masses.

* * * * *

UNITED STATES PATENT AND TRADEMARK OFFICE

CERTIFICATE OF CORRECTION

PATENT NO.    :  5,145,652

DATED         :  Sep. 8, 1992

INVENTOR(S)   :  Kurt Veser; and Hermann-Eugen Müller-Odenwald

It is certified that error appears in the above-identified patent and that said Letters Patent is hereby corrected as shown below:

On the title page item [63] should read as follows:

[63] Continuation of Ser. No. 399,499, filed as
     PCT/EP89/00048, Jan. 18, 1989, abandoned.

Signed and Sealed this

Seventh Day of September, 1993

Attest:

BRUCE LEHMAN

Attesting Officer    Commissioner of Patents and Trademarks